W. H. WOOD.

OUTLET BOX..

APPLICATION FILED OCT. 6, 1922.

Reissued Dec. 5, 1922. 15,504.

INVENTOR

William Henry Wood

BY

Redding & Sneeden

ATTORNEYS

BEST AVAILABLE COPY

Reissued Dec. 5, 1922.

Re. 15,504

UNITED STATES PATENT OFFICE.

WILLIAM HENRY WOOD, OF NORWALK, CONNECTICUT, ASSIGNOR TO ELECTRIC OUTLET COMPANY, INC., OF NEW YORK, N. Y., A CORPORATION OF NEW YORK.

OUTLET BOX.

Original No. 1,392,038, dated September 27, 1921, Serial No. 352,199, filed January 17, 1920. Application for reissue filed October 6, 1922. Serial No. 592,870.

*To all whom it may concern:*

Be it known that I, WILLIAM HENRY WOOD, a citizen of the United States, residing at Norwalk, in the county of Fairfield, in the State of Connecticut, have invented certain new and useful Improvements in Outlet Boxes, of which the following is a specification, reference being had to the accompanying drawings, forming a part hereof.

The present invention relates to electrical appliances, and has particular reference to an improvement in that type of devices which are known as outlet or wall boxes.

An object of this invention is to provide an outlet box which may be quickly and easily applied to walls of buildings which are already plastered, and without injury to the plaster during the application of the box and during the preliminary work required in placing and adjusting the wires which lead into and out of the box.

Another object of the invention is to provide an outlet box with a supporting plate or frame to be initially secured against the plaster before the opening is cut through the same for the wiring of the box, and which plate is constructed to form a template or guide for not only determining the correct size of the opening in the plaster to receive the box, but to also protect the marginal edge of the plaster during the cutting thereof and during the "fishing" and other operations required in the installation of wiring in a finished wall.

The above, and various other objects and advantages of this invention will in part be described in, and in part be understood from, the following detailed description of the present preferred embodiment, the same being illustrated in the accompanying drawing, wherein.

Figure 1:
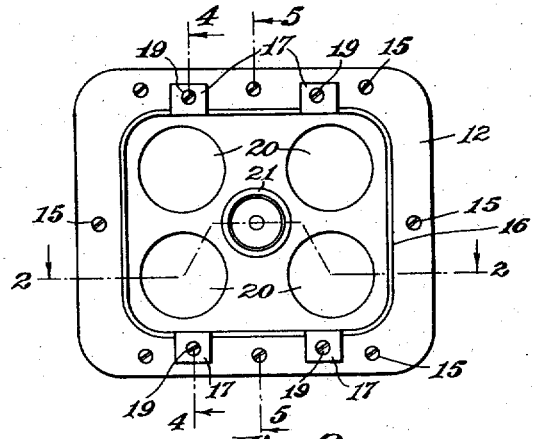
Figure 1 is an outer side view of an outlet box constructed according to the present invention and as applied to a wall.
Figure 2:
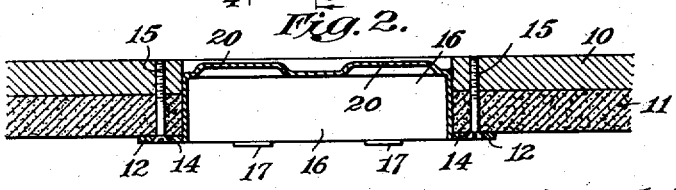
Figure 2 is a horizontal section taken on line 2—2, Fig. 1, with the fixture socket removed.

Referring to the drawing by numerals, 10 designates the lathing or base of a wall against which the plaster 11 is supported in the usual manner.

Figure 3:
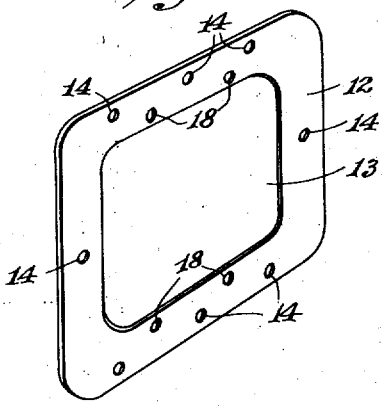
Figure 3 is a detail perspective view of the face plate or frame of the box.
Figure 4:
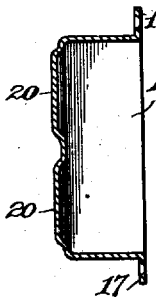
Figure 4 is a detail sectional view taken through the box on the line 4—4, Fig. 1.
Figure 5:
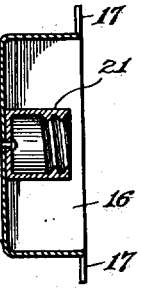
Figure 5 is a similar sectional view taken on the line 5—5, Fig. 1, illustrating the application of a fixture socket in the bottom of the box.

The outlet box of this invention embodies an attaching or frame plate 12 which is of desired configuration and which is relatively flat. As shown in the drawing, particularly Fig. 3, the plate is of rectangular construction with a box receiving opening 13 therein providing a frame to support the box when the latter is inserted through the opening. The plate or frame 12 is provided with a suitable number of openings 14 for the reception of screws 15, or the like, adapted to be passed through the plate 12, plaster 11 and lathing 10 to support the frame or plate against the exposed surface of the plaster 11 at the desired point where the outlet box is to be positioned. It will be observed that the inner marginal edge of the opening 13 is rounded at the corners and that the said inner edge forms a guide for a cutting tool which is usually employed for forming the opening in the plaster 11 to receive the box. This frame or plate 12 therefore serves as a template to define the size or marginal edge of the opening to be made in the finished wall.

In using the plate, it is secured against the finished wall by the screws 15, and the opening is cut through the wall to the configuration of the inner marginal edge of the plate 12. The plate 12 forms a protector for the marginal edge of the plaster during the "fishing" operation of the electrician, and during other necessary manipulations requiring the drawing of wires and tools through the opening in the plaster.

The plate 12 is adapted to carry a box 16 formed of sheet metal or the like and which is of the desired depth and has at its forward open side a desired number of outstanding tongues 17 adapted to overlap the outer face of the plate 12. The tongues 17 are provided with openings adapted to register with opening 18 formed in the frame plate 12 and to receive screws 19 or other fastening devices for rigidly securing the box 16 to the frame plate. The box 16 is of a size adapted to snugly fit in the opening 13 of the frame plate so as to seal the box

BEST AVAILABLE COPY in the wall when the box is inserted and secured through the plate. The box 16 is also provided with top covers 20 which comprise weakened portions of the bottom of the box and disk or other desired configuration, and which are easily removed from the bottom to admit the passage of wires, tubing and the like which extend into and lead out of the box. If desired, the box 16 may be provided within its center portion with a fixture receiving socket 21 riveted or otherwise suitably secured to the bottom of the box. When the socket 21 is employed, the box is adapted to be embedded in a ceiling or the like from which the fixture projects to afford a suitable support for the fixture, and the socket 21 of course may be modified in structure to accommodate fixtures of various types, such as the type known as the combination gas and electric fixture.

The corners of the frame 12 are preferably rounded at the marginal edge of the opening 13 to guide a cutting instrument for cutting the opening in the plaster.

The edges are rounded so that the cutting may be continuously drawn over the plaster against the guiding edge of the frame without interruption or abrupt change in the general direction of movement of the cutting instrument.

By use of this outlet box the plaster is protected, the box is seated firmly in the wall and sealed therein, the cutting of the plaster is made easy and accurate by using the frame plate as a guide and a protector, and when installed, the frame plate serves to reinforce the plaster about the opening and to impart a neat appearance to the work.

It is of course understood that various changes and modifications may be made within the scope of the following claims without departing from the spirit of this invention.

What I claim is:

1. That method of mounting an outlet box with a wall plate in a wall, which consists in securing the wall plate against the side of the wall, cutting an opening in the wall to the size and configuration of the inner marginal edge of the plate and seating a box in the openings of the wall and plate.

2. That method of mounting an outlet box with a wall plate in a wall, which consists in permanently securing the wall plate against the plaster, cutting the plaster within the opening of the wall plate and working the cutter along the inner marginal edge of the plate to gage the size of the opening and to protect the plaster, and securing a box through the opening of the wall plate and in the registering opening in the wall.

3. An outlet box comprising a flat plate having screw receiving openings for attaching the plate against a plastered wall, said plate having a central opening defining an opening to be cut in the wall and the marginal edge of the opening in the plate forming a guide for a cutting tool, and a box body of the configuration of the opening in the plate adapted to fit therein and extend into the opening in the wall when cut, said box body having outstanding portions at its forward edge adapted to overlap the front face of the frame plate and provided with means for securing the projecting portions to the plate.

4. An outlet box comprising a flat plate having screw receiving openings for attaching the plate against a plastered wall, said plate defining an opening to be cut in the wall and the edge of the plate forming a guide for a cutting tool, and a box body adapted to fit in the opening in the plate and extend into the opening in the wall when cut, said box having tongues adapted to overlie the plate, and means for securing the tongues to the plate.

5. That method of mounting an outlet box with a front plate in a wall, which consists in using the plate as a template to define the opening to be cut in the wall cutting the said opening, and fastening a box in the openings of the wall and plate.

6. As an article of manufacture a plate for the support of an outlet box formed to define the opening to be cut in the wall to receive said outlet box and having means to permit its fastening to the front of the wall and means to permit the fastening of the outlet box thereon.

This specification signed this 23rd day of September, A. D. 1922.

WILLIAM HENRY WOOD.